Figure 1:
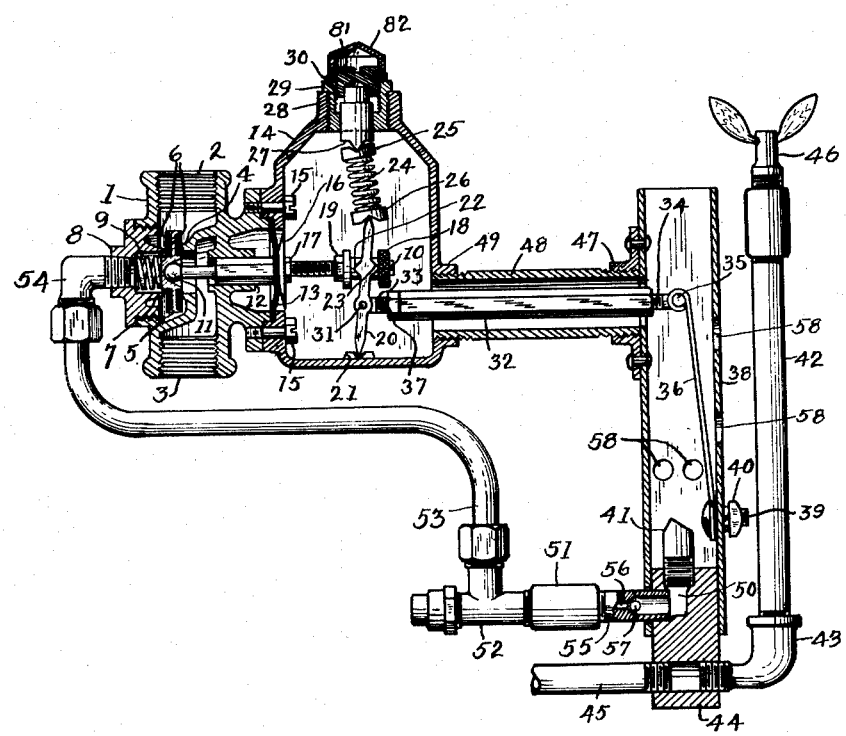

Jan. 19, 1932.  E. J. TE PAS  1,842,334
AUTOMATIC FUEL CONTROL SYSTEM
Filed April 21, 1928  2 Sheets-Sheet 1

Inventor
Edmund J. Te Pas

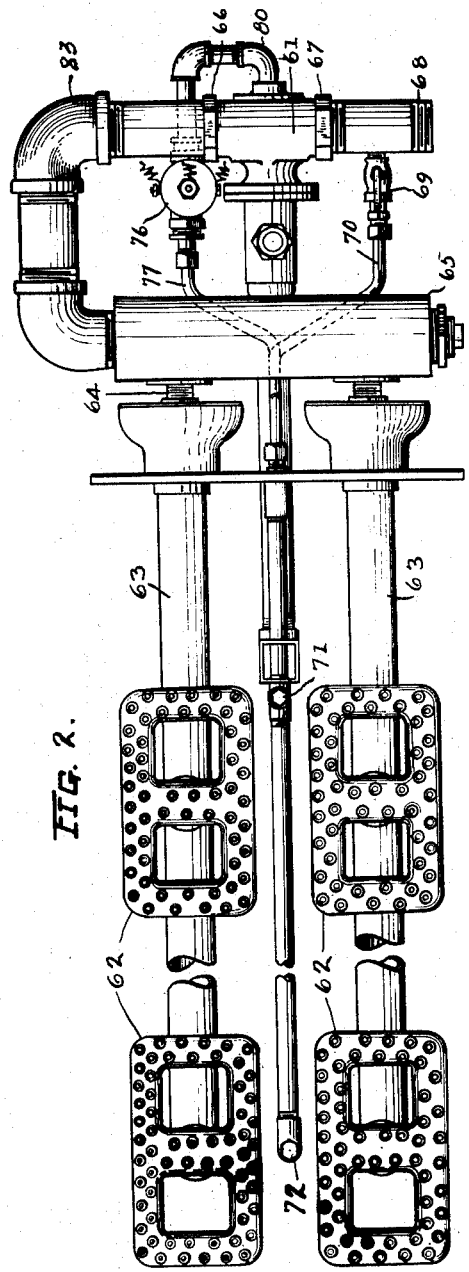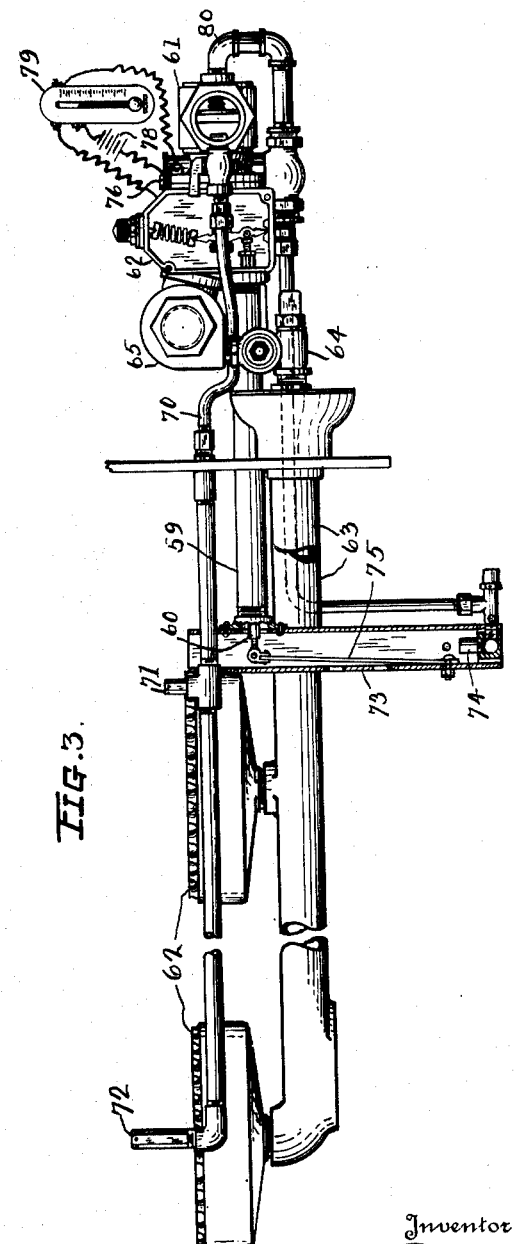

Patented Jan. 19, 1932

1,842,334

UNITED STATES PATENT OFFICE

EDMUND J. TE PAS, OF LAKEWOOD, OHIO, ASSIGNOR TO THE PATROL VALVE COMPANY, OF CLEVELAND, OHIO, A CORPORATION OF OHIO

AUTOMATIC FUEL CONTROL SYSTEM

Application filed April 21, 1928. Serial No. 271,805.

This invention relates to automatically controlled gas burning appliances and in particular gas burning appliances which are adapted to be electrically controlled by means of a thermostatic switch, and is a continuation in part of my earlier filed application Serial No. 184,166, filed April 15, 1927.

At the present time the most commonly used controls of this type comprise a temperature responsive thermostatic switch which controls a motor adapted to open and close a gas valve in accordance with the movements of the switch. In this case the motor and the valve are independent units. The motor may be either a gravity motor, a spring motor or an electric motor. All three of these types of motors are commonly used for this purpose.

Another form of control valve which is used in combination with a temperature responsive thermostatic switch is that in which an electrically operated gas valve is directly controlled by the thermostatic switch.

This latter arrangement is somewhat more compact than the arrangements cited above, as the valve and the electric operating motor are combined in a single unit, and for this reason it presents some advantages over the first named arrangements.

In controls of any of the above types it is customary to have a constantly burning pilot light adjacent the main heating burner of the appliance, so that when the automatic valve is opened admitting gas to the burner, a pilot light is present to ignite the gas issuing therefrom. In the event of extinguishment of the pilot light under the conditions just stated, raw gas will escape from the burner and may cause a serious explosion or lead to other hazardous results.

As a means to prevent the escape of unburned gas due to pilot light failure, thermostatic switches, controlled by the heat of the pilot flame and in circuit with the operating valve have been proposed. When the pilot light is burning these switches are in a closed position and the electrically controlled valve may operate in a normal manner. Upon extinguishment of the pilot light the thermostatic switch automatically opens breaking the circuit to the electrically controlled valve and preventing its opening and admitting gas to the main burner.

Such an arrangement is rather complicated and difficult to install. It is expensive and apt to become inoperative, requiring frequent servicing to keep the appliance in working condition.

It is an object of my invention to provide a control for gas burners that is inherently safe in its operation.

Another object of my invention is to provide an electrically controlled gas burning appliance which will remain in a normally closed position upon the extinguishment of the pilot light.

Another object of my invention is to provide a safety control for gas burning appliances of the type described which does not require the use of a thermostatic safety switch.

Another object of my invention is to provide a greatly simplified and inexpensive control for gas burning appliances that is inherently safe in its operation.

A further object of this invention is to provide an improved thermostatic valve which may be conveniently located adjacent the main heating burner and not be affected by the heat from this burner.

Stated in general terms my improved gas burner control comprises thermostatic flame operated valve which requires the presence of an ignition pilot flame for its operation.

The ignition flame which is instrumental in the opening of the valve is further used to ignite the gas admitted to the main burner upon the opening of this valve. The automatic control includes a thermostatic switch or room thermostat of the conventional type and a small electric solenoid valve which control the gas to the burner that is used to control the operation of the thermostatic main supply valve.

With my improved control it is possible to automatically operate practically any size gas valve by means of a thermostatically controlled solenoid valve of small size which may be operated from a few dry cells. With this arrangement it is possible to have an 1( automatic control of this type in houses which are not wire for electricity.

Another advantage of my improved control is that the main supply gas valve is thermally operated and requires the presence of an ignition pilot before it is possible to open the valve. By operating the valve in this manner it provides a safe means of operation for large gas fired heating units.

The particular form of thermostatic valve shown in this application is an improvement of the thermostatic valve shown in the copending application of Wallace J. Snow, Serial No. 123,561, filed July 19, 1926.

With the above mentioned and other objects in view, the invention consists in the novel construction, arrangement and combination of parts, hereinafter described, illustrated in some of its embodiments in the accompanying drawings and particularly pointed out in the appended claims.

Referring to the drawings; Fig. 1 is a side elevational view in section, of the thermostatic valve used in my improved control. Fig. 2 is a plan elevational view of my improved control connected to a multiple burner gas burning appliance. Fig. 3 is a side elevational view partly in section of the control shown in Fig. 2.

The thermostatic valve shown in Fig. 1 is of the snap acting type in which the operation of the valve is effected by the warping of a thermostatic valve. In the present instance the thermostatic valve consists of a valve body 1 having an inlet opening 2 and an outlet opening 3 and a valve seat 4 integrally formed in the valve body. A valve head 5, faced with a yielding material 6 such as leather, cooperates with the valve seat 4 to control fluid flow through the valve.

An auxiliary valve seat 7, having a seating face parallel to the valve seat 4 and in axial alignment therewith, is formed on the valve cap 8 and is adapted to cooperate with the valve head 5. A valve spring 9 is positioned between the valve cap 8 and the valve head 5 and serves to urge the valve head to its closed position. The valve head 5 is connected to valve stem 10 by means of a ball and socket joint 11. The valve body 1 is provided with a hexagonal opening 12 forming a bearing and guide for a similarly formed portion of the valve stem 10.

A flexible diaphragm 13 is clamped at its outer edge between the valve body 1 and the valve frame 14 by means of screws 15. At its central portion the diaphragm 13 is secured to the valve stem 18 by means of the washer 16 and the locknut 17. The diaphragm 13 constitutes a gas tight packing for the valve stem. An internally threaded spool 18 is mounted on the threaded portion of the valve stem 10 and is held in the desired position by means of a locknut 19. An oscillating lever 20 carried in a groove bearing 21, formed in the valve frame 14, straddles the spool 18 and is adapted by means of contacting edges 22 and 23 to make engagement with the enlarged ends of the spool 18 and in this manner effect the opening and closing of the valve by the valve head 5 and the valve seat 4.

A second resilient oscillating lever comprising a spring 24 having suitable bearing members 25 and 26 is in contacting engagement with the upper end of the oscillating lever 20. A bearing member 27 is adjustably mounted in the frame 14 and provides a means for adjusting the tension of the spring 24. This adjustment is affected by removing the closure cap 82 loosening the locknut 30 and raising or lowering the threaded member 81 which is threadably received in the bushing 29 that is threadably received in the boss 28 formed on the valve frame. The oscillating lever 20 is provided with a bearing pin 31 which provides a pivotal connection for the threaded rod 33 of the adjustable link 32. The link 32 is received at one end in the left-hand threaded member 34 which is pivotally connected at 35 to a thermostatic strip 36.

The adjustable link 32 is provided with a locknut 37 to lock this member in the desired position. The thermostatic member 36 consists of a strip of thermostatic metal of the usual and well known type which is made up of two different metals having a different coefficient of expansion and which are suitably bonded together. The composite laminated strip formed in this manner has the property of changing its shape when subjected to changes in temperature. The strip 36 is bolted to one side of the tube 38 by means of a bolt 39 and 40. A small gas burner 41 is positioned adjacent the lower end of the thermostatic strip 36 and provides a means for heating this strip. A constantly burning pilot burner 46 is located adjacent the top of the square tube 38 and provides a means for igniting the burner 41 when gas is admitted to this burner.

The pilot burner 46 is in communication with a conduit 42 which is received in an L fitting 43 carried in a passage formed in the block 44. The other end of this passage receives the gas supply pipe 45. The block 44 is drilled and threaded at its upper end for reception of a pilot burner 41 and is threaded at its side for reception of the gas and air mixing tube 55 having a central gas orifice 56 and lateral air inlets 57 and which is adapted to supply gas to the pilot 41.

The square tube 38 which serves as a housing for the thermostatic element 36, is riveted to a suitable pipe fitting 47 which is received on one end of the connecting pipe 48. The other end of the pipe 48 is threadably received in an internally threaded boss 49 formed on the valve frame 14.

The metal heating burner 41 which is received in a threaded opening 50 in the block 44 is connected in this manner to a conduit 51. The conduit 51 is in communication with a needle valve 52 of conventional design. The needle valve 52 is provided to control the maximum flow of gas to the metal heating burner 41. The needle valve 52 is in communication with a conduit 53 which is connected to a fitting 54 that is threadably received in the valve cap 8, and communicates with the valve port defined by the valve seat 7.

With the parts of the valve arranged as shown in Fig. 1, and with the constantly burning pilot light 46 in operation, when gas is admitted to the valve 1 by way of its inlet opening 2, a certain amount of it is bypassed by way of the port defined by the valve seat 7, the fitting 54, the conduit 53, the needle valve 52, the conduit 51, the burner block, conduit 50 and thence to the burner 41.

Gas emitted from the burner 41 flows to the top of the tube 38 where it is ignited by the flame of the burner 46. The burner 41 provides a blue flame. This is affected by the primary air mixer 55 which is provided with a reducing orifice 56 and lateral air inlet openings 57. In this manner a certain amount of air is mixed with the gas before it is admitted to the burner 41.

To further assist in combustion of the flame from the burner 41 air inlet openings 58 are provided in the sides of the tube 38 for the admission of a supply of air to support this flame. The holes or openings 58 also assist in cooling of the thermostatic strip 36 at such times as when it is desired to close the valve.

Assuming then, that there is a flame at the burner 41, it will be seen that this flame impinges upon the thermostatic element 36 causing it to warp to the left. This movement of the thermostatic member is transmitted to the adjustable link 32 and then to the oscillating lever 20. After a short time the oscillating lever 20 has moved past its vertical or dead center position and the spring 24 then snaps the lever 20 to its extreme left hand position.

The contacting edge 22 of the lever 20 engages the left hand face of the spool 18 just after the lever 20 passes dead center position and in this manner serves to snap the valve stem 10 and its associated valve head 5 to open position. The main valve seat 4 in the valve body 1 is uncovered by this movement and gas is free to pass through the valve by way of the outlet opening 3, to a gas burner. It will be noted in connection with the operation just described that in opening, the valve head 5 closed the valve port defined by the valve seat 7 which cut off the supply of gas to the burner 41 causing extinguishment of this burner.

Shortly after the burner 41 has been extinguished the thermostatic strip 36 cools and moves to the right tending to assume its original shape. As the strip 36 cools it draws the link 32 and associated lever 20 to the right. The valve spring 9 causes the valve head 5 and the valve stem 10 to follow the movement of the thermostatic strip 36. This action uncovers the valve seat 7 and again admits gas to the burner 41 which is ignited from the pilot burner 46 and serves to reheat the thermostatic strip 36.

Under actual working conditions when the valve 1 is in the open position the valve head 5 assumes a position of equilibrium which provides a very small flame at the burner 41. This flame is just sufficient to keep the valve in open position. By reason of the method of using the valve head 5 to control the supply of gas to the burner 41, overheating of the thermostatic metal is prevented and its useful life is considerably increased thereby.

When the gas supply to the inlet side 2 of the valve body 1 is shut off the burner 41 is automatically extinguished thereby. The thermostatic strip quickly cools, snapping the valve to its closed position. In this manner the valve 1 automatically opens and closes as its gas supply is opened or closed. The valve 1 is designed so that it can be readily applied to most any kind of gas burning appliance.

In general the only changes necessary in the valve for adapting it to different kinds of gas burning appliances is the lengthening or shortening of the connector pipe 48 and the adjustable link 32. When the valve is installed and in place ready for use, all of the operating elements of the valve which are within the fire box are located below the main heating burners and are exposed to the secondary air supply of the main burners. The elements above referred to include the tube 38 and its associated parts. The valve body and snap action mechanism are always located outside of the appliance and are connected to the gas supply line.

Figs. 2 and 3 illustrate one application of my improved thermostatic valve where it is used in combinaton with an automatically controlled gas burning furnace or boiler. In this case the operation of the burner is controlled by a room temperature thermostat located at a point at some distance from the appliance.

In adapting the valve to an appliance such as shown in Figs. 2 and 3, the connecting tube 59 corresponding to the tube 48, Fig. 1 has been somewhat lengthened for its application to this appliance. The adjustable link 60 which corresponds to the link 32 in Fig. 1 has been similarly lengthened for the same purpose. The valve body 61 corresponding to the valve body 1, Fig. 1, is shown in horizontal position with respect to the valve frame 62. In all other respects the thermostatic valve shown in Figs. 2 and 3, is a duplicate of and is constructed the same as the valve shown in Fig. 1.

The appliance upon which this valve is used has a series of burners 62 which are mounted upon gas and air mixing tubes 63 which are in communication at their outer ends with adjustable valves 64. These valves regulate the gas flow to the mixing tubes 63 and are threadably received in the manifold 65. The manifold 65 is in communication with the outlet end 66 of the valve 61 by means of a conduit 83 formed from the series of standard pipe fittings. The inlet end 67 of the valve 61 is in communication with the gas supply conduit 68.

A small gas cock 69 is in communication with the gas supply conduit 68 and controls the flow of gas to the conduit 70, which leads to the constantly burning pilot burner 71 and 72. The conduit 70 extends into the firebox of the appliance and is carried in a drilled extension of the tube 73. The conduit 70 supplies gas to a pair of pilot burners 71 and 72. The pilot burner 71 in this case takes the place of pilot burner 46 shown in Fig. 1 and functions in a similar manner.

The gas supply to the valve operating burner 74, which is provided to heat the thermostatic strip 75, is in communication with and under control of a solenoid valve 76, by way of the conduit 77. This electric valve is of well known and conventional design and is not shown in detail in the drawings. The inlet end of the solenoid valve is in communication with the side outlet opening of the thermostatic valve 61 by means of the fitting 80 which corresponds to the fitting 54 in Fig. 1.

The power to operate the solenoid valve is furnished by a source of electrical supply shown diagrammatically at 78. The source of electric current may be either a series of dry cells or where electric current is available it may be directly connected to this source of supply. In the latter case a transformer is used to reduce the current voltage to the proper amount. The valve shown herein is operated by a 12 to 15 volt current.

A thermostatic switch or room thermostat 79 of conventional design, is adapted to be located at some distant point where it is desired to maintain a predetermined temperature. The room thermostat 79 consists of a thermostatic switch which is suitably connected to the solenoid valve 76.

The thermostat 79 upon reaching the temperature for which it is set, closes an electrical circuit to the valve 76 which causes this valve to close. When the thermostat drops below the temperature for which it is set, current is supplied to the valve 76 by a circuit independent of the first named circuit and the valve is automatically opened thereby.

When used in connection with my improved thermostatic valve 61 the solenoid valve 76 automatically controls the supply of gas to the gas burner 74. Thus, when the room thermostat 79 calls for heat, the valve 76 is automatically opened admitting gas to the burner 74 from the thermostatic valve 61 by way of the conduits 80 and 77. Gas issuing from the burner 74 is ignited by the constantly burning pilot burner 71 causing the thermostatic strip 75 to become heated. Heating of the strip 75 causes it to become distorted, opening the valve 61 in the manner previously described and admitting gas to the burners 62 by way of the conduit 83 and manifold 65.

Gas issuing from the burners 62 is ignited by the constantly burning pilots 71 and 72 and the appliance continues to operate as long as the solenoid valve 76 is in its open position. When the temperature of the room in which the thermostat 79 is located, reaches a predetermined temperature for which the thermostat is set, the solenoid valve 76 is automatically closed by the room thermostat 79. In this manner the gas supply to the burner 74 is cut off. The thermostatic strip 75 then cools and returns to its normal position, closing the valve 61 and cutting off the supply of gas to the burners 62.

In this manner the operation of the burners 62 is automatically and safely controlled at a distant point by means of controlling the small gas supply required by the burner 74.

With this arrangement it is possible to control practically any thermostatic valve of ordinary size by a very small electrical valve such as 76, as an excess of energy over that required for the opening of the valve can be provided by a very small gas burner such as 74 when used to cause the movement of a bimetallic operating element such as 75.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. In a thermostatic valve, valve mechanism, a thermally actuated means operatively associated therewith, a support for said thermally actuated means, a gas burner carried by said support positioned to heat said thermally actuated means, a relatively long flash tube enclosing said burner and having an open end opposite said burner, and an ignition burner for said gas burner positioned above the said open end of said flash tube so that said thermally actuated means is unaffected by the heat of said ignition burner.

2. A main burner, a valve to control the flow of gaseous fuel to said main burner, a constantly burning pilot burner in lighting proximity to said main burner, heat responsive means for actuating said valve, said means being remotely positioned with respect to said main burner and pilot burner, an auxiliary burner positioned at a point remote from said pilot burner for supplying heat for the operation of said heat responsive means, a flash conduit adjacent to and enclosing the flame of said auxiliary burner and having an open end adjacent said pilot burner to provide flash ignition means for said auxiliary burner, and means to control the flow of gaseous fuel to said auxiliary burner.

3. A main burner, a valve to control the flow of gaseous fuel to said main burner, a constantly burning pilot burner in lighting proximity to said main burner, heat responsive means for actuating said valve, said means being positioned materially out of the heating range of said main and pilot burners, an auxiliary burner remotely positioned with respect to said pilot burner for supplying heat to said heat responsive means for the operation of said valve, a flash conduit enclosing said auxiliary burner and having a block in one end thereof for supporting said auxiliary burner, said conduit having an open end adjacent said pilot burner to provide flash ignition means for said auxiliary burner, and means to control the flow of fuel to said auxiliary burner.

4. In a gas burning appliance of the character described, a fuel supply conduit, a heating burner in communication with said fuel supply conduit, a pilot burner in constant communication with said fuel supply conduit, a valve for controlling the supply of fuel to said heating burner, heat responsive means for operating said valve, an auxiliary burner in communication with said fuel supply conduit for supplying heat to said heat responsive means, said auxiliary burner being ignitable by said pilot burner and being remote therefrom, and a second valve having thermostatic operating means controlled by room temperature conditions at a distance remote from said appliance for positively controlling the supply of fuel to said auxiliary burner.

5. A main burner, a valve to control the flow of fuel to said main burner, a constantly burning pilot burner in lighting proximity to said main burner, an auxiliary burner remotely positioned with respect to said pilot burner, means for controlling the flow of fuel to said auxiliary burner, a flash tube having its one end adjacent to said auxiliary burner and surrounding the flame of said auxiliary burner and having its opposite end open and adjacent said pilot burner, a thermal element positioned within said tube between the ends thereof having an operating connection with said valve and positioned to be actuated by heat supplied by said auxiliary burner, said tube and pilot burner providing flash ignition means for said auxiliary burner.

6. An automatically controlled gas heating appliance comprising a main heating burner, a thermally actuated valve for controlling the flow of gas to said main heating burner, a constantly burning pilot burner in lighting proximity to said heating burner, an auxiliary burner remote from and cooperatively associated with said pilot burner to control the operation of said thermally actuated valve, said thermally actuated valve also being positioned to regulate the flow of fuel to said auxiliary burner when gas is being supplied to said heating burner, an automatically operated second valve to cut off and permit the supply of fuel to said auxiliary burner independently of the operation of said thermally actuated valve, and means responsive to room temperature conditions for controlling said second valve.

7. In a gas burning appliance, a main burner, a fuel supply conduit in communication with said burner, a thermally actuated valve for controlling the flow of gas to said main burner, a constantly burning pilot burner, heat responsive means remotely positioned with respect to said pilot burner for actuating said valve, an auxiliary burner for supplying heat to said heat responsive means, said auxiliary burner being in communication with said supply conduit and remote from said pilot burner, a flash tube positioned between said auxiliary burner and pilot burner for providing flash ignition from said pilot burner to said auxiliary burner, and a control valve independent of said thermally actuated valve for controlling the supply of fuel to said auxiliary burner.

8. A main burner, a thermally actuated valve for controlling the flow of gaseous fuel thereto, a constantly burning pilot burner for igniting said main burner when fuel is supplied thereto, an auxiliary burner remotely positioned with respect to said pilot burner, a flash tube surrounding said auxiliary burner and having an opening therein remote from said auxiliary burner and disposed adjacent said pilot burner to provide flash ignition of said auxiliary burner from said pilot burner, a thermal element mounted within said flash tube responsive to the heat of said auxiliary burner and having a connection with said valve for operating said valve, and means to regulate the flow of fuel to said auxiliary burner.

9. In a quick acting thermostatic gas valve, snap action mechanism for actuating said valve, heat responsive means for imparting movement to said snap action mechanism, a flash tube surrounding said heat responsive means, an auxiliary burner at one end of said tube remote from said heat responsive means for heating said means, said tube having an opening at its opposite end, a pilot burner adjacent said last mentioned end of said tube remote from said heat responsive means and adjacent said opening whereby said auxiliary burner may be ignited by flash ignition from said pilot burner, and means to control the functioning of said auxiliary burner.

10. An automatically controlled gaseous fuel burning appliance, comprising a main burner, a valve to control the supply of fuel to said main burner, heat responsive means operably associated with said valve, an auxiliary burner to supply heat to said means, a constantly burning pilot burner positioned to ignite fuel issuing from said auxiliary burner, an electric valve to control the flow of fuel to said auxiliary burner, and a remote thermostatic device responsive to room temperature conditions to control the operation of said electric valve.

11. An automatically controlled gaseous fuel burning appliance, comprising a source of fuel supply, a main burner in communication with said source, a valve to control the supply of fuel to said main burner, heat responsive means operatively associated with said valve, an auxiliary burner to supply heat to said heat responsive means, a constantly burning pilot burner positioned to ignite said auxiliary burner, a fuel supply conduit extending between said source of fuel supply and said auxiliary burner to supply fuel to said auxiliary burner, a control valve for said auxiliary burner positioned in said fuel supply conduit, and a thermostatic means operable in accordance with room temperature conditions at a distance remote from said auxiliary burner to positively control the operation of said control valve.

12. In a gas burning appliance, a main heating burner, a fuel supply conduit in communication with said burner, a thermally actuated valve in said conduit for controlling the flow of gas to said main heating burner, a constantly burning pilot burner, auxiliary burner means for supplying the heat necessary for actuating said valve, said burner means being in communication with said supply conduit and being remote from said pilot burner, a flash tube positioned to provide flash ignition from said pilot burner to said auxiliary burner means, and a control valve for cutting off and admitting the flow of fuel to said auxiliary burner means, said thermally actuated valve including snap action mechanism for causing rapid actuation thereof.

In testimony whereof I affix my signature.

EDMUND J. TE PAS.